(12) United States Patent
Huang et al.

(10) Patent No.: US 7,101,514 B2
(45) Date of Patent: Sep. 5, 2006

(54) CONTROL DEVICES FOR EVAPORATIVE CHEMICAL MIXING/REACTION

(76) Inventors: Po-Hao Adam Huang, 10430 Westchester Ave., San Diego, CA (US) 92126; Chih-Ming Ho, 11959 Mayfield, Unit 5, Brentwood, CA (US) 90049

( * ) Notice: Subject to any disclaimer, the term of this patent is extended or adjusted under 35 U.S.C. 154(b) by 0 days.

(21) Appl. No.: 10/060,737

(22) Filed: Jan. 30, 2002

(65) Prior Publication Data
US 2002/0102762 A1 Aug. 1, 2002

Related U.S. Application Data

(60) Provisional application No. 60/265,455, filed on Jan. 31, 2001.

(51) Int. Cl.
B01J 19/00 (2006.01)
B01J 19/24 (2006.01)
B81B 7/00 (2006.01)
F02K 7/00 (2006.01)

(52) U.S. Cl. ............... 422/129; 422/198; 422/187; 431/1; 431/2; 431/157; 60/722

(58) Field of Classification Search ........ 422/187–191, 422/193, 198–199, 108–109; 431/170, 326, 431/328, 258, 254
See application file for complete search history.

(56) References Cited

U.S. PATENT DOCUMENTS

| | | | | |
|---|---|---|---|---|
| 1,753,897 A | * | 4/1930 | Loeb ..................... | 431/264 |
| 3,881,701 A | | 5/1975 | Schooenman et al. | |
| 4,376,627 A | * | 3/1983 | Forster et al. ............ | 431/192 |
| 5,403,184 A | * | 4/1995 | Hosaka et al. ............ | 431/170 |
| 5,595,712 A | | 1/1997 | Harbster et al. .......... | 422/129 |
| 5,690,763 A | * | 11/1997 | Ashmead et al. .......... | 156/60 |
| 5,811,062 A | | 9/1998 | Wegeng et al. ............ | 422/129 |
| 6,162,046 A | * | 12/2000 | Young et al. ............. | 431/11 |
| 6,193,501 B1 | | 2/2001 | Masel et al. ............. | 431/170 |
| 6,554,607 B1 | * | 4/2003 | Glezer et al. ............ | 431/1 |

OTHER PUBLICATIONS

International Search Report dated Dec. 13, 2002.

O.D. Jefimenko, "Electrostatic Current Generator Having a Disk Electret as an Active Element," IEEE Trans. Ind. Appl. vol. 1A-14, pp. 537-540, 1978.

Tada, "Experimental Characteristics of Generalized Electret Generator, Using Polymer Film Electrets," IEEE Trans. Electrical Insulation, vol. E1-21, No.3, pp. 457-464, 1986.

Y.C. Tai, "A High Performance MEMS Thin-Film Teflon Electret Microphone," *1999 International Conference on Solid-State Sensors and Actuators* (Transducers '99), Sendai, Japan, Jun.(1999).

Akane, Toshi et al., "GaN Ablation Etching Using Short Wavelength Pulsed Laser," RIKEN Review No. 43 (Jan., 2002) Focused on 2nd International Symposium on Laser Precision Microfabrication, 2001.

Sugioka, Koji, "Laser Precision Microfabrication," Laser Technology Laboratory, RIKEN.

(Continued)

Primary Examiner—Alexa Doroshenk Neckel
Assistant Examiner—Jennifer A. Leung
(74) Attorney, Agent, or Firm—Greenberg Traurig LLP

(57) ABSTRACT

An improved chemical mixing micro-device with features on the micro- and nano-scale. The micro-device is comprised of at least one chemical inlet port and one chemical outlet port, a micro-evaporator, a micro-chamber and a micro-initiator. Also, a method of mixing at least one chemical in an evaporative mixing and/or reacting chamber is disclosed.

14 Claims, 2 Drawing Sheets

OTHER PUBLICATIONS

Wegeng, Robert S., et al. "Micro Chemical System Development Progress at the Pacific Northwest National Laboratory," Pacific Northwest National Laboratory, Washington, 1997.

Wegeng, Robert S., et al., "Chemical System Miniaturization," PNNL SA-27317, A.I.C.H.E 1996 Spring National Meeting, Invited Paper #107a, New Orleans, Feb. 1996.

Suzuki, Hiroaki, et al., "A Magnetic Force Driven Chaotic Micro-Mixer," Proceedings, MEMS, Las Vegas, 2002.

Erbacher, Christoph, et al., "Towards Integrated Continuous-Flow Chemical Reactors," Mikrochimica Acta, Austria, 1999.

Liu, Robin H., et al, "Passive Mixing in a Three-Dimensional Serpentine Microchannel," Journal of Microelectromechanical Systems, vol. 9, No. 2, Jun. 2000.

* cited by examiner

CONTROL DEVICES FOR EVAPORATIVE CHEMICAL MIXING/REACTION

This application claims priority to U.S. Provisional Patent Application 60/265,455, filed on Jan. 31, 2001, which is hereby incorporated by reference in its entirety into the present disclosure.

BACKGROUND OF THE INVENTION

1. Field of the Invention

This invention relates generally to micro-scale chemical mixing devices and, more particularly, to a micro-scale device including a mixing reactor that uses non-pressurized liquid chemical with no moving parts.

2. General Background and State of the Art

Micro-Electro-Mechanical Systems (MEMS) is the integration of mechanical elements, sensors, actuators, and electronics on a common silicon substrate through the utilization of microfabrication technology. While the electronics are fabricated using integrated circuit (IC) process sequences, the micromechanical components are fabricated using compatible "micromachining" processes that selectively etch away parts of the silicon wafer or add new structural layers to form the mechanical and electromechanical devices.

MEMS brings together silicon-based microelectronics with micro-machining technology, thereby, making possible the realization of complete systems-on-a-chip. MEMS also uses silicon-based materials because silicon possesses excellent materials properties. For example, silicon has greater strength-to-weight ratio than other engineering materials. Hence, silicon can be used in high-performance mechanical applications. However, MEMS may also encompass any other micro-machining materials.

A typical MEMS includes: 1) microsensors; 2) microactuators; 3) microelectronics; and 4) microstructures. For example, in its most basic form, micro-sensors gather physical information from the environment through measuring mechanical, thermal, biological, chemical, optical, and magnetic phenomena. The microelectronics process the information derived from the micro-sensors and through some decision making capability direct the micro-actuators to respond by moving, positioning, regulating, pumping, and filtering. Hence, controlling the environment for some desired outcome or purpose. Since MEMS devices maybe manufactured using batch fabrication techniques, many levels of functionality, reliability, and sophistication can be placed on a small silicon chip at a relatively low cost.

In short, MEMS is an enabling technology allowing a new way of making complex electromechanical systems using batch fabrication techniques; similar to the way integrated circuits are made.

MEMS manufacturing technology has at least two distinct advantages. First, MEMS is an extremely diverse technology that potentially could significantly impact many categories of commercial and military products. Already, MEMS is used for many products and methods ranging, for instance, from in-dwelling blood pressure monitoring to active suspension systems for automobiles. The nature of MEMS technology and its diversity of useful applications makes it potentially a far more pervasive technology than even integrated circuit microchips. Secondly, MEMS blurs the distinction between complex mechanical systems and integrated circuit electronics. Typically, sensors and actuators are the most costly and unreliable part of a macro-scale sensory-actuator-electronics system. In contrast, MEMS technology allows complex electromechanical systems to be manufactured using batch fabrication techniques, which reduces the cost and increases the reliability of the sensors and actuators.

MEMS is based on a manufacturing technology that has roots in microelectronics, however MEMS is now intimately integrated into macro devices and systems. Thus, MEMS can be applied where size, weight and power must decrease while functionality increases, and at the same time be cost effective.

For example, MEMS accelerometers are quickly replacing conventional accelerometers for crash air-bag deployment systems in automobiles. The conventional approach uses several bulky accelerometers made of discrete components mounted in the front of the car with separate electronics near the air-bag. MEMS has made it possible to integrate onto a single silicon chip the accelerometer and electronics at a reduced cost when compared to the conventional accelerometers. Also, the MEMS accelerometers are much smaller, more functional, lighter, more reliable.

Another application of MEMS technologies is in the area of integrated micro-power generation systems, or MPG. For example, chemicals typically used in MPG systems are high in energy density in comparison with batteries (i.e. rechargeable battery, ~150 Whr/kg whereas diesel chemical, ~12,000 Whr/kg). Also, as discussed above, advantages of using MEMS to fabricate MPG include integration of micro-sensors and micro-actuators, complex fluidic system designs using etching and material deposition, and enhance heat transport.

Typically, thermal power generation systems consist of a chemicals injected into the combustor to create heat energy, and a converter that converts the heat energy into electrical energy, or via kinetic energy. Power generation on the micro and nano-scale level is being developed as a means to optimize chemical usage (increase functionality), while minimizing the size of such power producing devices. Standard mechanical combustion devices contain many other large moving parts in addition to a combustion chamber including valves, pressure tanks and/or pumps and devices to mix and ignite the chemical and oxidize it. Thus, with traditional components, standard combustion devices can be large (i.e. on the order of centimeter to meter scale) and heavy, and consequently are not useful as portable, high energy power sources. Thus, smaller and simpler devices are desirable as compact and efficient power sources.

Another problem with traditional combustion devices is that chemical needs to be converted from a liquid state to gaseous state. However, direct injection of liquid chemicals are disadvantageous because they may clog or plug up the internal volume of the combustion device and its components. Alternatively, gaseous chemical injections do not clog or plug up the combustion device. Thus, the liquid chemicals that are used in traditional combustion devices may ultimately impair the longevity and efficiency of MPGs. Therefore, different methods of chemical injection must be devised for the MPGs.

However, one persistent problem in MGPs is the fact that mixing of fluids in the micro-domains is not as effective as in macro-domains. Furthermore, gases mix at orders of magnitudes faster than liquids. So, ideally mixing should be performed at gaseous phase whenever possible.

Therefore, now more than ever, there is a need for research development of useful, efficient and portable nano- and micro-scale chemical mixing devices. Ideally, such devices will employ chemical combustion, heat transfer, fluid dynamics and acoustics.

INVENTION SUMMARY

There is disclosed and claimed herein a micro-device comprised of a plurality of laminae and having at least one inlet and one outlet port and made of materials selected for compatibility with one or more chemicals.

In accordance with another aspect of the present invention, the micro-device comprises at least a micro-evaporator, a micro-chamber and a micro-initiator for chemical mixing and/or reacting with one or more chemicals.

In accordance with another aspect of the present invention, the micro-evaporator, the micro-chamber and the micro-initiator have features on the micro- or nano-scale and are fabricated using micro-machining-based technologies.

In accordance with another aspect of the present invention, the micro device comprises a micro-evaporator including a plurality of holes and grooves to increase surface adhesion and enhance chemical flow; a micro-chamber allowing the mixing of chemical components; and a micro-initiator providing initial or sustained energy to facilitate chemical mixing and/or reactions.

In accordance with another aspect of the present invention, the micro-evaporator is located substantially directly in adjacency, preferably underneath, the micro-chamber and reaction caused by the micro-initiator converts chemicals from a first phase into chemicals of a second phase into the chamber.

In accordance with another aspect of the present invention, at least one chemical component is passed into the chamber by at least one chemical inlet port.

In accordance with another aspect of the present invention, at least one chemical component is passed into the chamber by at least one chemical inlet port and at least one gas phase chemical is passed into at least one other chemical inlet port.

In accordance with another aspect of the present invention, the chemical components can be the same or they can be different.

In accordance with another aspect of the present invention, the micro-initiator is comprised of an array of platinum or some other high-temperature quality material, or alternatively the micro-initiator is comprised of free-standing wires including thermoresistive wires or micro-spark plugs.

In accordance with another aspect of the present invention, feedback temperature and pressure control may be maintained by means of temperature and pressure sensors also comprised of platinum or some high-temperature quality materials.

In accordance with another aspect of the present invention, the micro-device optimally contains no valves, chemical pumps, pressurized chemical lines or pumps typically found in macro-scale mixers or reactors for the liquid chemicals.

Another aspect of the present invention is a method of mixing at least one chemical in a micro-chamber to generate energy.

In accordance with another aspect of the present invention, a method of mixing one or more chemicals comprises: introducing at least one chemical component into the micro-chamber system; enhancing the chemical flow using chemical feed paths including a plurality of channels that enhance surface adhesion; trapping chemical components on a micro-evaporative pad or screen consisting of a plurality of holes and grooves; mixing chemical components in the micro-chamber located in substantial adjacency, preferably directly above the evaporative pad; converting reacting components from chemical energy to kinetic energy; and equilibrating the high-pressure inside the micro-chamber with an exhaust outlet.

In accordance with another aspect of the present invention, the method of mixing one or more chemicals uses at least one chemical component which is a liquid chemical.

In accordance with another aspect of the present invention, the method of mixing one or more chemicals uses at least one liquid chemical and at least one oxidizer.

In accordance with another aspect of the present invention, the method of mixing one or more chemicals uses the same or different chemicals.

In accordance with another aspect of the present invention, the method of mixing one or more chemicals wherein the chemicals are the same or different chemicals and further comprises at least one gaseous chemical.

In accordance with another aspect of the present invention, temperature sensors and/or pressure sensors are in close proximity to the evaporative pad and may be used to control the temperature and pressure inside the micro-chamber via the micro-initiator.

In accordance with another aspect of the present invention, the method of controlling the temperature and pressure is made of platinum or other high-temperature performance materials.

In accordance with another aspect of the present invention, the method of mixing chemicals optimally uses no valves, chemical pumps, pressurized chemical lines or pumps.

The above described and many other features and attendant advantages of the present invention become apparent from a consideration of the following detailed description when considered in conjunction with the accompanying drawings.

DETAILED DESCRIPTION OF THE PREFERRED EMBODIMENTS

Figure 1:
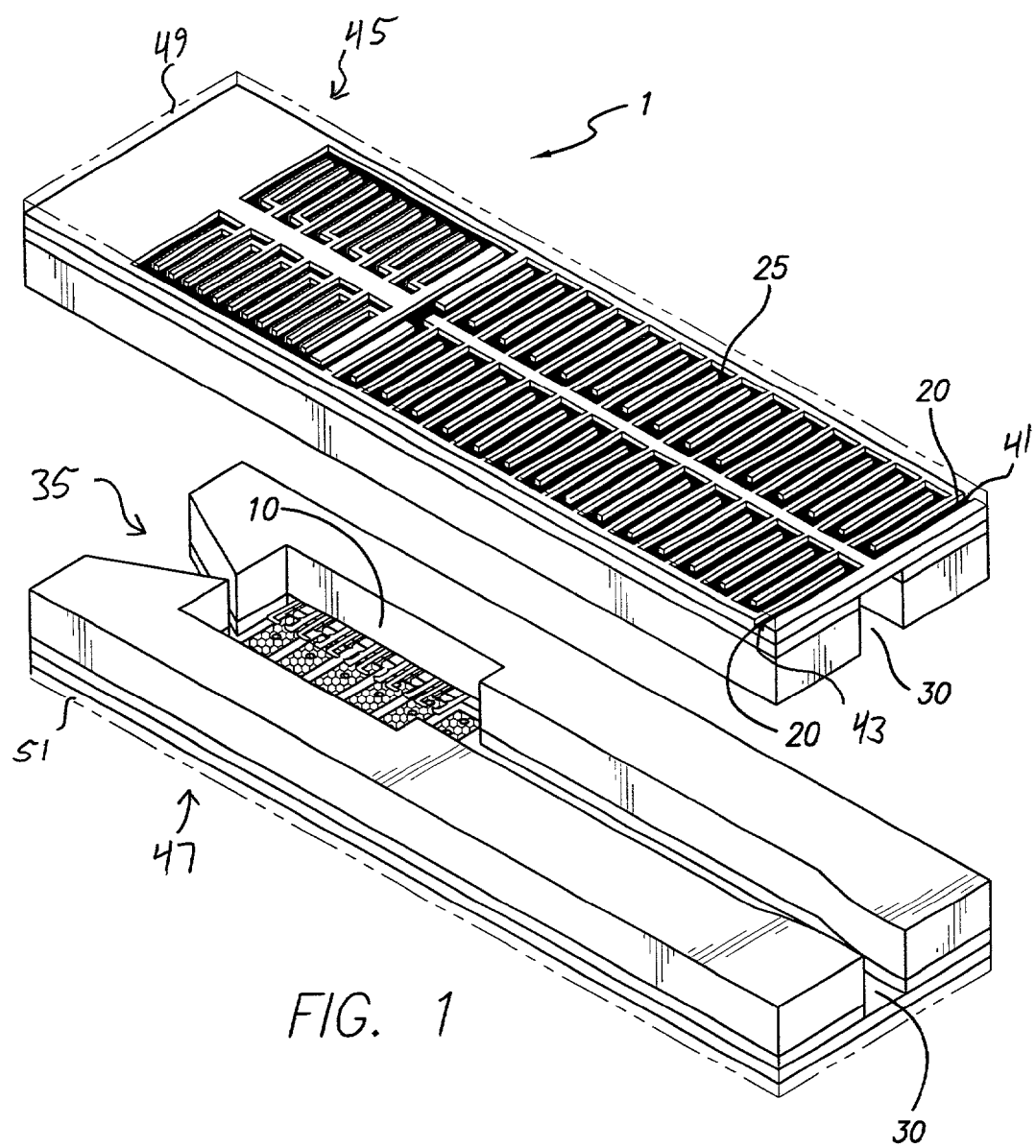
FIG. 1 is a diagram showing two symmetric halves of one embodiment of an evaporative mixing device.

While the specification describes particular embodiments of the present invention, those of ordinary skill can devise variations of the present invention without departing from the inventive concept.

Further, this description is not to be taken in a limiting sense, but is made merely for the purpose of illustrating the general principles of the invention. The section titles and overall organization of the present detailed description are for the purpose of convenience only and are not intended to limit the present invention. It is to be understood that other embodiments can be utilized and structural and functional changes can be made without departing from the scope of the present invention.

The present invention is an evaporative chemical mixing device 1. Typically the device 1 is made from silicon, however other micro-machining materials can be used. From a systems perspective, the evaporative/mixing device includes three parts: 1) micro-evaporator, evaporative screen or pad 5; 2) micro evaporative mixing and/or reacting chamber 10; and 3) micro-initiator 15. Briefly, the micro-evaporator 5 converts liquid phase chemicals into gaseous phase chemicals. The chemicals mix inside the chamber 10 containing the micro-evaporator 5. The micro-initiator 15, in general, enhances the mixing and/or reaction of the chemicals and can ignite the combined species in the chamber 10 to generate power.

The micro device consists of a number of different modes and uses chemical mixing, heat transfer, radiative transfer, fluid dynamics and feedback control. Through simple analogies with existing macro combustible engines, the mixing device 1 can be designed to resemble a pulsed "jet" engine or pulsed "rocket" engine. In the pulsed "jet" mode, the acoustic waves of the evaporative/mixing device are used to draw in fresh air for the next combustion cycle through a front inlet 35. In the pulsed "rocket" mode, both the liquid chemical and oxidizer are supplied through inlets 20, evaporated, mixed locally, and combusted. In the pulsed "rocket" mode the front inlet 35 can be sealed since the chemicals are supplied through the inlets 20. In either approach, the onboard combustible species are liquid and non-pressurized. In other embodiments one or more gas combustible species can be supplied.

In general, a chemical is evaporated naturally and mixed with another chemical such as an oxidizer in the chamber 10. The oxidizer can be naturally aspirated through the front inlet 35, introduced through an inlet 20, or in the case of a liquid oxidizer, introduced through an inlet 20 and onboard evaporated. The mixed chemical/oxidizer vapor is then ignited by initiator arrays 15 (i.e. micro spark plugs) that ensures rapid and complete mixing and/or reaction with a small length scale. In the case of the reaction including combustion, the initiator arrays can have a length scale that is only slightly larger than the flame quenching distance. This in effect creates a safe thermal reactor because the flame quenches itself after combustion while its pressure wave propagates at high speed toward an exhaust nozzle 30. As the waves expand outwards, the pressure drops significantly in the evaporative mixing and/or reacting chamber 10 due to the rapid decrease of density and temperature. In the embodiment in which the chamber 10 includes the front inlet 35, as the shock wave front exits the chamber 10, the low-pressure in the chamber 10 automatically draws in fresh air through from the front inlet 35 (functioning like a pulsed jet engine) for mixing with the evaporating chemical for the next mixing cycle.

In a pulsed rocket engine mode type, instead of mixing with surrounding air, the evaporative/mixing device 1 can be designed to use chemical non-pressurized oxidizers that evaporate and are mixed with another chemical prior to mixing/reacting. For example, a chemical non-pressurized liquid oxidizer can be introduced into one of the inlets 20 while a combustible liquid chemical can be introduced into one of the inlets 20. In other embodiments, gas oxidizers and/or gas combustible chemicals can be introduced into the inlets 20 instead of or in addition to the liquid oxidizer and combustible liquid chemical. When the pressure wave of the reflected wave fronts meet at the end of the mixer 1, a high stagnation pressure is created, enhancing the thermal dynamic efficiency. The chemical reactants allow sufficient cooling of the reaction chamber through phase change (evaporation) while the surface adhesion forces aid in chemical reactant delivery. The combustion is controlled in real time by the spatial and temporal ignition sequences of the initiators 15.

In a preferred embodiment of the present invention, liquid hydrocarbon chemical is evaporated, rather than injected, into the evaporative mixing and/or reacting chamber 10. The present invention allows numerous benefits not found in other micro-power generators, or MPGs. Due to the small volume, the fixed stoichiometric chemical/oxidizer ratios means that very little chemical is required. In turn, this translates to the fact that evaporation of chemical is more than enough to introduce chemical vapors into the evaporative mixing and/or reacting chamber 10 since volume decreases faster than surface area as the length scale decreases. In short, decrease in volume is proportionate to increase in surface area. Thus, one distinct advantage of evaporative mixing is that the initial chemical used can be a liquid chemical since the high temperatures of the evaporative mixing and/or reacting chamber 10 enhances chemical evaporation and converts to the liquid chemical to a gas phase chemical.

Further, as compressed air (or evaporated oxidizer) rushes into the evaporative mixing and/or reacting chamber 10 (refer to FIG. 1), mixing of the chemical begins. In fact, the evaporation of chemical molecules directly means chemical/oxidizer mixing when diffusion is used through temporal transport parameter in addition to the more typical spatial transport; note that the fluid in the evaporative mixing and/or reacting chamber 10 is also moving due to acoustic excitations.

Figure 2:
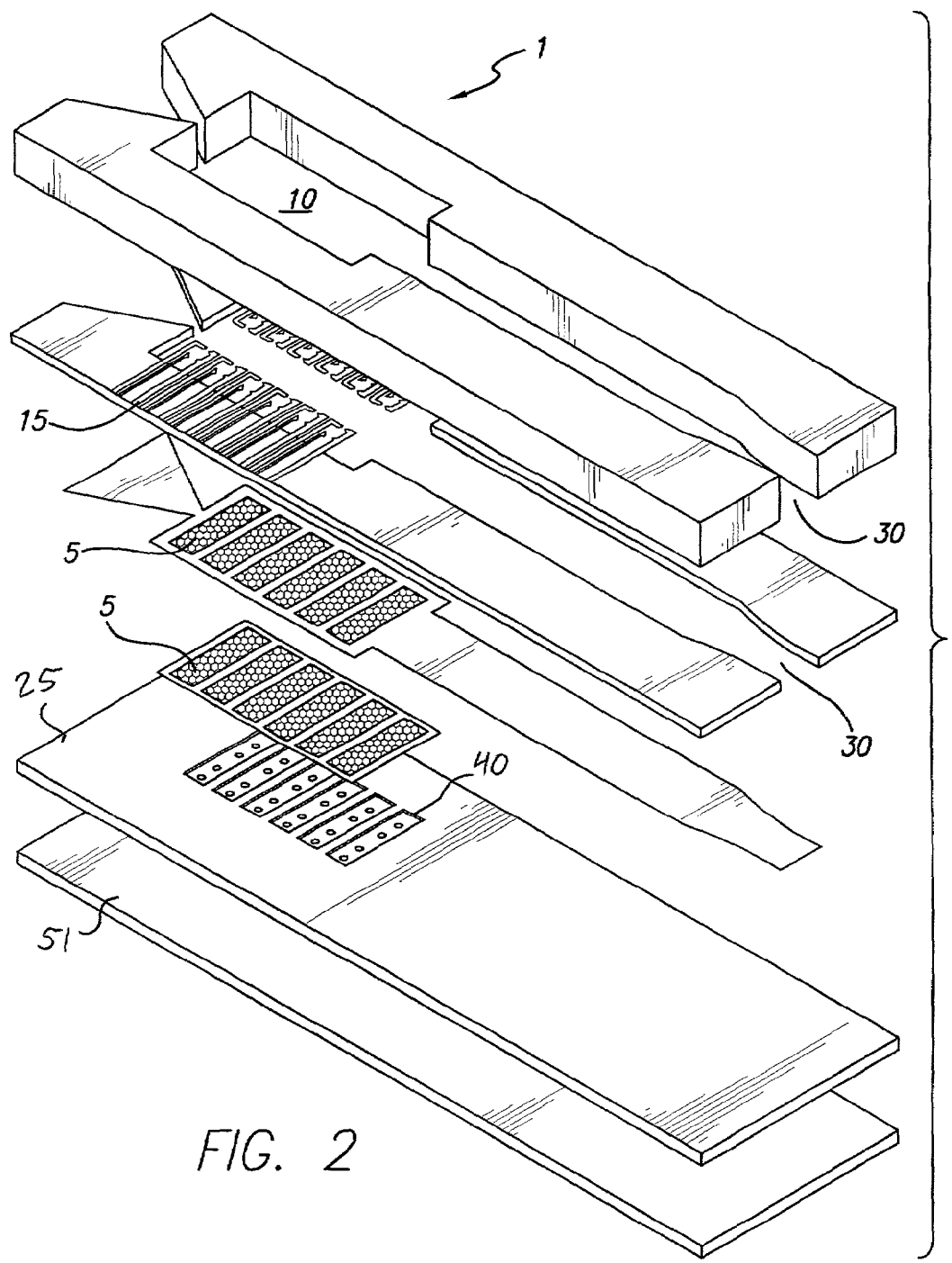
FIG. 2 is a diagram showing the different layers of one half of the embodiment of the evaporative mixing device of FIG. 1.

The evaporative mixing and/or reacting chamber 10 (FIG. 1) is located in a multi-layered evaporative/mixing micro-device. The top 45 and bottom 47 layers of the evaporative/mixing micro-device are nearly identical, or symmetrical, containing evaporative screens, or pads 5, which are shown enlarged in FIG. 2. In one embodiment, the evaporative pads 5 in the top and bottom layers are supplied fluids by the inlets 20 for the introduction of first 41 and second 43 chemicals (FIG. 1). Similar inlets can be provided in both the top 45 and bottom 47 layers. Other embodiments can provide for a single inlet 20, different numbers of inlets in the top and bottom layers, and/or more than two inlets in each layer. The chemicals 41 and 43 can both be fluid chemicals, or for example chemical 41 can be a fluid chemical and chemical 43 can be some type of fluid oxidizer. The fluids can be gas or liquid, for example, but the evaporative screen 5 works to evaporate liquids. Obviously if gas is used then there is no need to "evaporate" the gas. After the introduction of chemical/oxidizer, each chemical travels via the chemical feed path 25 (FIG. 1) separately toward the evaporative pad or screen 5. The delivered chemicals can then rest in a fuel chamber 40, which is separated by the evaporative screen, or pad 5 (refer to FIG. 2 ), substantially directly underneath the evaporative mixing and/or reacting chamber 10. Thus, when both the top 45 and bottom 47 layers contain fuel chambers 40 and evaporative pad or screens 5, the chamber 10 is effectively sandwiched between the fuel chambers 40 and evaporative pad or screens 5. The feed paths 25 are covered by covers or lids 49, 51.

The evaporative pad 5 is a thin membrane fabricated by MEMS technology and contains micro holes and grooves to enhance chemical flow through surface adhesion. The high adhesion at the evaporative pad 5 acts as a fluidic pump that "sucks" the chemical from the fuel chambers 40 to draw in more chemical from an external chemical tank from a line attached to the chemical inlets 20 at ambient pressure. The high surface adhesion between the chemicals 41, 43 and the evaporative pads 5 prevents any pressurization of chemical back into the fuel chambers 40, as well as any back-pressure due to gravitational effects, for example, gyrating the mixing device 1 does not affect the device 1 significantly. The chemicals evaporate from the evaporative pads 5 to enter the chamber 10 in the gaseous phase. The evaporative pads 5 are gaseously connected to the chamber 10. The use of ambient pressure chemical inlets allows for the device 1 to have no valves, chemical pumps, pressurized chemical lines or pumps typically found in macro-scale engines.

Hence, inside the evaporative mixing and/or reacting chamber 10, the chemicals are mixed, and converted from liquid phase to gaseous phase. Subsequently since very little chemical is required due to the small volume of chemical reactions (chemical/oxidizer), maintenance of the chemical reactions stoichiometric ratios are sustainable through evaporation alone.

Once the chemicals are evaporated on the evaporative pad 5 and mixed in the evaporative mixing and/or reacting chamber 10, a micro initiator 15 starts the chemical reaction. Integration of a temperature sensor on the diaphragm can ensure proper evaporative mixing and/or reacting chamber 10 control is achieved on the evaporative pad 5. Temperature sensors fabricated out of platinum can be used because platinum is a good for use in high-temperature applications. Alternatively, other high temperature performance materials may also be used. The micro-initiator 15 may also be fabricated as an array of thermally insulated freestanding wires.

Typically, MPGs do not mix chemical and air (oxidizer) efficiently. However, in the present invention there is sufficient time for the liquid chemical to evaporate into the low-pressure evaporative mixing and/or reacting chamber 10 while simultaneously an evaporated oxidizer supplied by the micro-evaporators 5 (or air supplied by the front inlet 35) rushes into the same evaporative mixing and/or reacting chamber 10.

The evaporative mixing and/or reacting micro-device of the present invention can contain integrated arrays of temperature and pressure sensors coupled with feedback loops which may control the ignition sequence of the micro initiators 15 for ensuring high operational reliability and efficiency.

Although the present invention has been described in terms of the preferred embodiment above, numerous modifications and/or additions to the above-described preferred embodiments would be readily apparent to one skilled in the art.

By way of example, but not limitation, this invention is best used for very light and compact chemical mixers/reactors. For example, this invention enables the manufacture of very small chemical based heat engines.

In one embodiment the device 1 can have dimensions of approximately 8×4.5×38 mm. The device of this embodiment contains no moving parts such as pumps or valves. A non-pressurized liquid fuel is used, therefore the device of this embodiment contains no pressurized lines, valves or pressurized tanks.

In closing, it is noted that specific illustrative embodiments of the invention have been disclosed hereinabove. However, it is to be understood that the invention is not limited to these specific embodiments. Accordingly, the invention is not limited to the precise embodiments described in detail hereinabove. With respect to the claims, it is the applicant's intention that the claims not be interpreted in accordance with the sixth paragraph of 35 U.S.C. § 112 unless the term "means" is used followed by a functional statement.

We claim:

1. A micro-machined chemical-mixing device comprising: a stack of a plurality of laminae, said laminae defining a plurality of micro-machined elements therein, including, an evaporator for evaporating a liquid chemical, said evaporator comprising an inlet in fluid communication with a supply of non-pressurized liquid chemical, a feed path that delivers said liquid chemical to the evaporator inlet, a membranous pad having a plurality of patterned holes and grooves defined thereon for increasing the surface adhesion and flow of the chemical within the evaporator, and an outlet that discharges the evaporated chemical from said evaporator;

a chamber for mixing and combusting the evaporated chemical, said chamber located adjacent to said evaporator and comprising a first inlet, a second inlet and an outlet, wherein said first inlet is in fluid communication with said evaporator outlet and said second inlet is in fluid communication with a supply of non-pressurized oxidizer, and wherein the evaporated chemical entering the chamber via said first inlet mixes with the non-pressurized oxidizer entering the chamber via said second inlet to thereby form a volume of combustible fluid, said chamber further comprising an initiator for providing energy to combust said volume of combustible fluid according to a desired ignition sequence; and an exhaust nozzle for discharging the combusted fluid from said device, said nozzle fluidly communicating with said chamber outlet, and said nozzle being elongated and narrow relative to the length and width, respectively, of said chamber;

wherein, during the operation of said device, the combustion of the volume of combustible fluid within said chamber generates a pressure wave that propagates toward the chamber outlet and through the exhaust nozzle, thereby causing a temporary state of low-pressure within said chamber that automatically draws in additional oxidizer through said second inlet to mix with additionally evaporated chemical from said evaporator, and thereby forming a new volume of combustible fluid to be subsequently combusted, in a controlled manner, based on said ignition sequence.

2. The device of claim 1, wherein the supply of non-pressurized oxidizer comprises a gaseous oxidizer.

3. The device of claim 2, wherein the gaseous oxidizer comprises ambient air.

4. The device of claim 1, wherein said feed path comprises at least one channel for delivering said liquid chemical to said evaporator.

5. The device of claim 1, wherein said laminae comprise at least one material selected from the group consisting of silicon, plastic, ceramic and glass based materials.

6. The device of claim 1, wherein said evaporator comprises at least a second inlet to allow for the supply of at least a second chemical to said evaporator.

7. The device of claim 6, wherein the supply of non-pressurized oxidizer comprises a gaseous oxidizer, and the gaseous oxidizer mixes with at least two different chemicals in said chamber to form said volume of combustible fluid.

8. The device of claim 1, wherein said initiator comprises at least one igniter selected from the group consisting of spark plugs and thermo-resistive wires.

9. The device of claim 1, wherein the chamber comprises at least one temperature sensor for detecting efficient mixing between the evaporated chemical and the oxidizer.

10. The device of claim 9, wherein the chamber comprises at least one pressure sensor for detecting efficient mixing between the evaporated chemical and the oxidizer.

11. The device of claim 1, wherein the device contains no valves, chemical pumps, pressurized chemical lines or pumps.

12. The device of claim 1, wherein the device contains no moving parts.

13. A system for mixing and combusting chemicals, said system comprising: a micro-machined chemical-mixing device formed by a stack of a plurality of laminae, said laminae defining a plurality of micro-machined elements therein, including,
- an evaporator for evaporating a liquid chemical, said evaporator comprising an inlet in fluid communication with a supply of non-pressurized liquid chemical, a feed path that delivers said liquid chemical to the evaporator inlet, a membranous pad having a plurality of patterned holes and grooves defined thereon for increasing the surface adhesion and flow of the chemical within the evaporator, and an outlet that discharges the evaporated chemical from said evaporator;
- a chamber for mixing and combusting the evaporated chemical, said chamber located adjacent to said evaporator and comprising a first inlet, a second inlet and an outlet, wherein said first inlet is in fluid communication with said evaporator outlet and said second inlet is in fluid communication with a supply of non-pressurized oxidizer, and wherein the evaporated chemical entering the chamber via said first inlet mixes with the non-pressurized oxidizer entering the chamber via said second inlet to thereby form a volume of combustible fluid, said chamber further comprising an initiator for providing energy to combust said volume of combustible fluid according to a desired ignition sequence; and
- an exhaust nozzle for discharging the combusted fluid from said device, said nozzle fluidly communicating with said chamber outlet, and said nozzle being elongated and narrow relative to the length and width, respectively, of said chamber;

wherein, during the operation of said device, the combustion of the volume of combustible fluid within said chamber generates a pressure wave that propagates toward the chamber outlet and through the exhaust nozzle, thereby causing a temporary state of low-pressure within said chamber that automatically draws in additional oxidizer through said second inlet to mix with additionally evaporated chemical from said evaporator, and thereby forming a new volume of combustible fluid to be subsequently combusted, in a controlled manner, based on said ignition sequence.

14. A method of mixing and combusting chemicals, comprising the steps of:
a) providing a micro-machined chemical mixing device, said device being formed from a stack of a plurality of laminae, said laminae defining a plurality of micro-machined elements therein, including,
- an evaporator for evaporating a liquid chemical, said evaporator comprising an inlet in fluid communication with a supply of non-pressurized liquid chemical, a feed path that delivers said liquid chemical to the evaporator inlet, a membranous pad having a plurality of patterned holes and grooves defined thereon, and an outlet that discharges the evaporated chemical from said evaporator;
- a chamber for mixing and combusting the evaporated chemical, said chamber located adjacent to said evaporator and comprising a first inlet, a second inlet and an outlet, wherein said first inlet is in fluid communication with said evaporator outlet and said second inlet is in fluid communication with a supply of non-pressurized oxidizer, said chamber further comprising an initiator; and
- an exhaust nozzle for discharging the combusted fluid from said device, said nozzle fluidly communicating with said chamber outlet, and said nozzle being elongated and narrow relative to the length and width, respectively, of said chamber;

b) supplying the liquid chemical to said evaporator and evaporating the chemical, wherein the membranous pad functions to increase the surface adhesion and flow of chemical within the evaporator;

c) supplying the evaporated chemical from said evaporator to said chamber via the first inlet to mix with the non-pressurized oxidizer supplied via the second inlet, the mixture of evaporated chemical and non-pressurized oxidizer forming a volume of combustible fluid;

d) activating the initiator to provide energy to combust the volume of combustible fluid, wherein the combustion generates a pressure wave that propagates toward the chamber outlet and through said exhaust nozzle, thereby causing a temporary state of low-pressure within said chamber that automatically draws in additional oxidizer through said second inlet to mix with additionally evaporated chemical from said evaporator and to thereby form new volumes of combustible fluid; and e) controlling the operational temperature and operational frequency of said device by activating the initiator according to a desired ignition sequence for subsequently combusting the new volumes of combustible fluid.

* * * * *

UNITED STATES PATENT AND TRADEMARK OFFICE
CERTIFICATE OF CORRECTION

| | | |
|---|---|---|
| PATENT NO. | : 7,101,514 B2 | Page 1 of 1 |
| APPLICATION NO. | : 10/060737 | |
| DATED | : September 5, 2006 | |
| INVENTOR(S) | : Po-Hao Adam Huang and Chih-Ming Ho | |

It is certified that error appears in the above-identified patent and that said Letters Patent is hereby corrected as shown below:

Column 1, line 8, insert:

--This invention was made with Government support of Grant No. DAAH01-01-1-R002, awarded by DARPA. The Government has certain rights in this invention.--

Signed and Sealed this

Seventh Day of October, 2008

JON W. DUDAS
*Director of the United States Patent and Trademark Office*